United States Patent [19]

Guimelli

[11] Patent Number: 4,919,467
[45] Date of Patent: Apr. 24, 1990

[54] VEHICLE SAFETY SCREEN FIXING MEANS

[75] Inventor: Mark A. Guimelli, Moana South, Australia

[73] Assignee: Rees Operations Pty. Ltd., Pyympton North, Australia

[21] Appl. No.: 269,963

[22] Filed: Nov. 9, 1988

[51] Int. Cl.⁵ ............................................. B60R 27/00
[52] U.S. Cl. ................................................... 296/24.1
[58] Field of Search ...................... 296/24.1; 410/129; 248/201

[56] References Cited

U.S. PATENT DOCUMENTS

| | | | |
|---|---|---|---|
| 2,733,952 | 2/1956 | Wright et al. | 296/24.1 |
| 2,998,279 | 8/1961 | Mateny | 296/24.1 |
| 3,049,373 | 8/1962 | Biggers | 296/24.1 X |
| 4,035,014 | 7/1977 | Sellers | 296/24.1 |
| 4,708,384 | 11/1987 | LaRosa | 296/24.1 |

Primary Examiner—Charles A. Marmor
Assistant Examiner—Michael Mar
Attorney, Agent, or Firm—Edward W. Callan

[57] ABSTRACT

A load safety screen assembly includes a safety screen having a peripheral frame adapted to be mounted in the interior of a vehicle so as to extend transversely thereof between a load carrying area and a front or rear seat. The screen is anchored to the vehicle by brackets, securing straps and fasteners. A first pair of brackets project rearwardly from and are positioned one at or near each upper corner of the safety screen frame and a second pair of brackets project rearwardly from and are positioned one at or near each lower corner of the screen frame. A pair of upper short length metal securing straps are pivotally attached at their forward ends to respective ones of the upper brackets, with the trailing end of each of the upper straps being adapted for securement to anchorage points in a body panel in the vicinity of the vehicle roof. A pair of lower short length metal securing straps are pivotally attached at their forward ends to respective ones of the lower brackets, and a pair of lower relatively long length metal securing straps are pivotally attached at their forward ends to respective ones of the lower brackets. The trailing ends of either the pair of short length lower straps or the pair of relatively long length lower straps are selectively secured by the fasteners to a pair of opposed anchorage points fixed in a body panel in the vicinity of the vehicle floor.

4 Claims, 2 Drawing Sheets

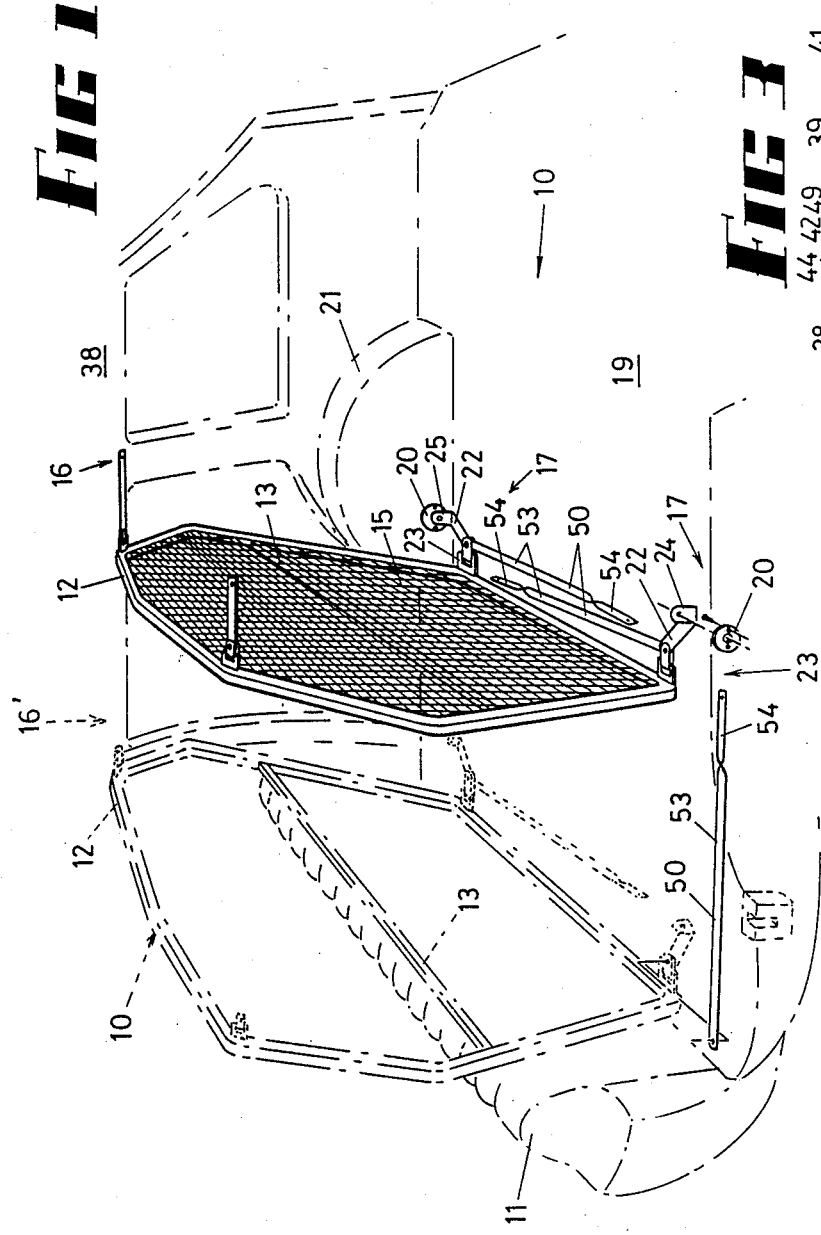
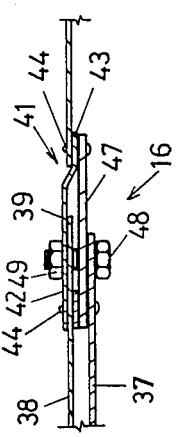

VEHICLE SAFETY SCREEN FIXING MEANS

This invention relates to improvements in and to a vehicle safety screen which is useful in a vehicle to inhibit the forward movement of a load carried behind a driver or passenger, and in particular to an improved means for fixing the safety screen in position within the vehicle.

In many instances tray trucks are provided with heavy upstanding frames which are capable of resisting forward movement of a load on a truck should that truck come to a sudden halt due to an impact in the case of an accident, for example. This has been found to be generally satisfactory in protecting the driver and passenger or passengers in the truck cab, but the load safety screens which are being used in other types of vehicles, for example panel vans and station wagons, have not been equally as successful and it is possible for a heavy load to cause the screen to break away under impact conditions of the vehicle.

The main object of this invention is to provide a means whereby a safety screen is less likely to be ineffectual than safety screens which have been previously used, and in particular an improved safety screen securing system which will securely anchor the safety screen and significantly reduce the likelihood of the screen breaking away from its anchorage under impact conditions of the vehicle which might result in a heavy load being impacted against the screen.

It is a further object of the present invention to provide an improved securing system for a motor vehicle safety screen which allows the safety screen to be simply and quickly installed in more than one position within the vehicle.

According to this invention therefore, a safety screen assembly comprises a safety screen including a peripheral frame adapted to be mounted in the interior of a vehicle so as to extend transversely thereof between the load carrying area and its front or rear seat and securing means for anchoring the screen when mounted in the vehicle, said securing means comprising a first pair of rearwardly extending short-length metal securing straps positioned one at or adjacent each upper corner of the safety screen and a second pair of rearwardly extending securing straps positioned one at or adjacent each lower corner of the screen, each said securing strap having its forward end pivotally attached to respective attachment means projecting rearwardly from and attached to the safety screen frame, the trailing or rear end of each strap of the first pair of straps being adapted for securement to the vehicle body panel in the vicinity of the vehicle roof, each of the straps of the second pair of straps having its rear or trailing end adapted for securement to an attachment point in the vicinity of the motor vehicle floor.

Preferably, each said attachment means comprises a fixed mounting bracket secured to the screen frame, a U-shaped connector member having its opposed legs projecting rearwardly, the connector member being carried by said fixed mounting bracket for limited rocking movement, and pivot means carried between the legs of the connector member and pivotably supporting the leading end of a respective said securing strap located between the legs. With this arrangement, each of the securing straps (prior to being fixed at its trailing end) is able to be freely pivoted about one pivot axis as well as bodily rotated through a limited arc about an axis at right angles to said one pivot axis. Such movement of the straps greatly facilitates the securement of their rear ends to their respective fixed attachment points in the vehicle.

In a preferred embodiment of the present invention, each of the upper straps has its trailing end secured to a mounting plate which is located by inserting same through a hole drilled in the body panel and fixed, e.g. by rivetting, to the panel. Each mounting plate comprises a first planar portion arranged to lie contiguous with that face of the vehicle body panel remote from the associated said upper securing strap, and a second planar portion displaced from the plane of the first portion arranged to lie contiguous with that surface of the vehicle body panel facing the securing strap. A transverse securing bolt clampingly secures together the mounting plate, the body panel and the upper securing strap. Preferably, a cover plate is interposed between the mounting plate and the securing strap so as to conceal the mounting plate and the manner in which it is fixed to the vehicle body panel.

In another preferred embodiment, each of the upper mounting plates comprises a captive nut welded intermediate its ends on the outer face thereof, the transverse securing bolt being arranged to threadably engage the captive nut in order to effect the clamping arrangement.

In another preferred embodiment of this invention, where the safety screen is mounted immediately behind the foot seat of the goods carrying vehicle, each of the lower securing straps is relatively long and extends approximately horizontally across the vehicle floor and lying adjacent thereto. Preferably, the rear end of the strap is arranged to be secured to an attachment point on the wheel arch of the vehicle. With this arrangement, the same lower fixing points can be used for the safety screen regardless of whether it is mounted in its forward position behind the front seat or in its rear position behind the rear vehicle seat.

Preferably, each of the metal securing straps comprises a series of transverse corrugations intermediate the ends thereof, the corrugations being effective to absorb some of the initial impact force when the goods impact against the safety screen, whereby the initial loading is absorbed by the straps themselves rather than the attachment points of the safety screen.

In order to more fully explain the applicant's invention, an embodiment is described hereunder in some further detail with reference to the accompanying drawings in which:

FIG. 1 is a perspective view of a safety screen mounted behind the rear passenger seat of a station wagon vehicle (the screen also being shown in dotted lines mounted behind the front seat);

FIG. 3 is a part sectional plan view showing the fixing of the upper securing strap to the vehicle body panel.

Figure 2:
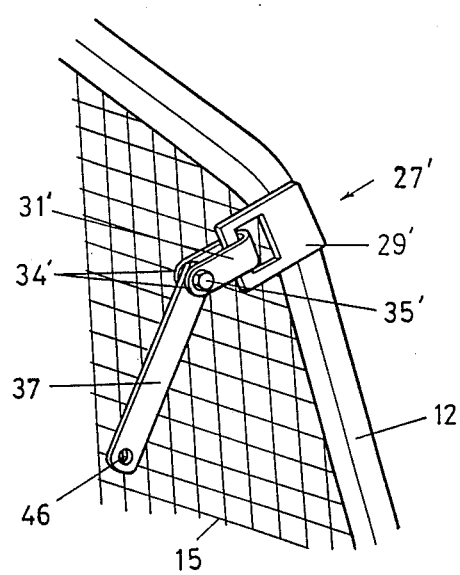
FIG. 2 is a fragmentary perspective view showing the connection between the upper securing strap and the screen.

The invention is applicable to a wide range of goods carrying vehicles, for example station wagons, panel vans, and utilities, the necessary changes being made, but in this embodiment the safety screen is arranged for securing between the loading carrying area of a station wagon and its rear passenger seat. With reference to the accompanying drawings, the safety screen 10 is shown (in dotted lines) mounted in a foward position immediately behind the front passenger seat 11 of the vehicle, and also in its rear position immediately behind the rear passenger seat. The screen 10 is formed with a peripheral frame 12 of tubular metal and at least one intermediate transversely extending frame member 13, the space between the peripheral frame 12 being filled with a heavy wire mesh 15 which, however, allows a driver to still have rear vision from a central interior rear vision mirror.

In this embodiment, the safety screen 10 is secured in position by means of four anchorage points, there being two fixing points 16 in the upper region of the sides of the vehicle (i.e. near the roof) and also two lower fixing points 17 in the vicinity of the floor 19 of the vehicle.

Figure 4:
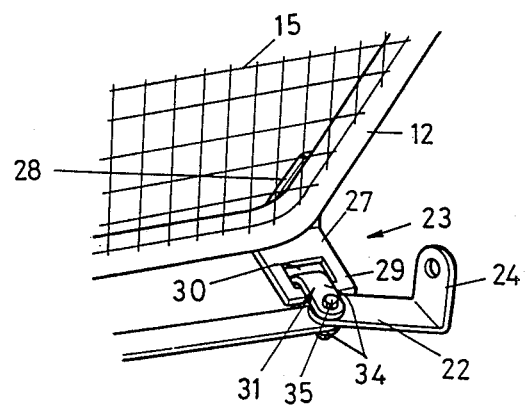
FIG. 4 is a fragmentary perspective view similar to FIG. 2 for the lower strap.

Each of the lower anchorage points 17 comprises a discoid plate 20 which is, in this embodiment secured by pop-rivets to a respective wheel arch panel 21. Each of the lower corners of the safety screen 10 is secured with respect to the discoid plates 20 by means of a pair of short length metal securing straps 22 each of which has its forward end pivotally attached to a bracket mounting 23 fixed to the screen frame 12 and its rear or trailing end fixedly secured, by means of a threaded fastener 25 to the discoid plate 20. As shown in FIG. 4, the strap 22 is bent to form an upwardly inclined portion 24 which is provided with a hole at its rear end for receiving the fastener 25. Each bracket mounting 23 comprises an angle bracket 27 having an upwardly extending limb 28 welded to the frame 12 and an approximately horizontal limb 29 projecting rearwardly from the peripheral frame 12 of the safety screen 10, the limb 29 being provided with an aperture 30 for locating a U-shaped connector 31, the bridge portion of which passes through the aperture 30 and engages against the aperture forming wall 32, the legs 34 of the connector 31 projecting rearwardly and defining a space in which is accommodated the forward end of the securing strap 22, the strap 22 being pivotally attached to the connector 31 by means of a pivot bolt 35. The connector 31 is able to be bodily "rocked" in a vertical plane as well as moved bodily to and fro in an horizontal plane, whereby the securing strap 22 in turn is able to be rotated bodily by a limited amount in a vertical plane, in addition to it being able to be pivoted about the pivot bolt 35.

The safety screen 10 has its upper corners secured to respective upper anchorage points 16 by means of rearwardly projecting short length upper metal securing straps 37, each of which has its leading or forward end pivotally attached with respect to the safety screen peripheral frame 12 in a manner similar to that described for the lower securing straps 22. As shown in FIG. 2, however, the bracket 27' is fixed to the frame 12 so that its rearwardly projecting limb 29' is disposed approximately vertically along with its associated connector 31' whereby the latter can be bodily "rocked" in an approximately horizontal plane (or laterally of the limb 29'). The leading end of the strap 37 is pivotally connected to the connector 31' by pivot bolt 35' supported by the opposed legs 34' of the connector 31', for pivotal movement about an axis transverse to the plane of the connector 31', whilst the trailing end of the strap 37 is fixedly secured to the side body panel 38 of the vehicle in the vicinity of the vehicle roof. Each of the upper anchorage points 16 comprises a metal mounting plate 39 which is arranged to extend through a hole 41 drilled in the vehicle body panel 38, the mounting plate 39 being arranged to have a first planar portion 42 engaging against the "outer" surface of the body panel 38, and a second planar portion 43 arranged to engage against the "inner" surface portion of the panel 38 in the vicinity of the hole 41. The mounting plate 39 is fixed in position by means of pop-rivets 44. The rear end of the securing strap 37 has an apertured portion 46 which abuts against a cover plate 47 positioned between the panel 38 and the portion 46, and a securing bolt 48 extends transversely through the portion 46, cover plate 47, panel 38 and mounting plate 39 and is threadably engaged within a captive nut 49 secured, by welding, to the outer face of the mounting plate 39, whereby the securing strap 37 and the mounting plate 39 are clampingly secured together.

In the event of the vehicle coming to a sudden halt or an impact collision, the load which is carried behind the screen will have its forward movement arrested by the screen which thereby protects a passenger or driver of the vehicle from any possible injury. With this invention, the safety screen is anchored in such a way that there is virtually no possibility of the screen breaking away from its anchorage points under impact conditions of the vehicle.

When the screen 10 is required to be mounted immediately behind the front seat 11 of the vehicle (as shown in dotted lines in FIG. 1), there is provided a pair of elongate mounting arms 50 which are used in lieu of the short length straps 22, the arms 50 being connected at their ends in the same manner as the straps 22. Preferably, each of the arms 50 is formed of plate metal which has a substantially horizontal planar arm portion 53 which merges with an approximate vertical planar portion 54 (formed by twisting the arm 50 through approximately 90°) which is anchored to the wheel arch anchorage point 17. The upper straps 37 are anchored at their forward ends to new anchorage points 16' in the vicinity of the vehicle roof. This arrangement allows the same lower anchorage points to be used for securing the safety screen in either of its positions as shown in the accompanying drawing, and thereby avoid the need for additional mounting points to be provided within the vehicle. When the screen 10 is mounted in its rearward position, the mounting arms 50 are conveniently stored by simply detaching their rear ends and rotating same inwardly in the direction of the screen so as to lie alongside thereof, the straps 22 in turn being rotated outwardly ready for anchoring their outer ends to the anchorage points 17.

In a variation to the above description, the fixed angle brackets 27 may be replaced by a rearwardly projecting U-shaped metal rod bracket so as to form a closed loop with the screen frame. The connectors 31, 31' can then be simply straddled around the bridge portion of the loop.

In another variation to the above embodiment, the straps/arms 22, 50 are formed from plate metal and have a series of transverse corrugations intermediate their ends. When a load encounters the screen, there will be some forward movement as the corrugations strain, and thus the time component of the dynamic force is increased and therefore the dynamic force is correspondingly decreased.

In yet another variation, the lower portion of the screen may be anchored in position by one or more intermediate securing straps, their trailing ends being secured to mountings fixed in the floor of the vehicle. Still further, the bracket attachment assembly connecting the forward end of each strap to the screen frame may be varied to that previously described, and, for example, the connectors 31 for the lower straps 22 may be disposed similar to the connectors 31' for the upper straps 37 by having the fixed brackets 27 attached to the side frame member of the screen rather than the bottom frame member as shown in the drawings. It is of course desirable that the straps be capable of pivotal movement as well as bodily rotational movement to facilitate their installation.

While this embodiment describes the use of four anchorage points, a person skilled in the art will understand that additional anchorage points may be used, particularly in the case of a van or panel-van type vehicles. In these vehicles, fixing points can be located in the van walls, and where the screen is particularly high, the additional anchorage points provide greater rigidity to the screen.

I claim:

1. A load safety screen assembly comprising a safety screen including a peripheral frame adapted to be mounted in the interior of a vehicle so as to extend transversely thereof between a load carrying area and a front or rear seat and securing means for anchoring the screen when mounted in the vehicle, said securing means comprising a first pair of bracket means projecting rearwardly from and positioned one at or near each upper corner of the safety screen frame and a second pair of bracket means projecting rearwardly from and positioned one at or near each lower corner of the screen frame, each said bracket means including a fixed bracket member secured to the frame and movable connector means loosely carried by the fixed bracket member, a pair of upper short length metal securing straps pivotally attached at their forward ends to respective ones of said connector means of said upper bracket means, the rear or trailing end of each of said upper pair of straps being adapted for securement to anchorage points in a body panel in the vicinity of the vehicle roof, a pair of lower short length metal securing straps pivotally attached at their forward ends to respective ones of said connector means of said lower bracket means, and a pair of lower relatively long length metal securing straps pivotally attached at their forward ends to respective ones of said connector means of said lower bracket means, each of said lower straps having an aperture at its rear or trailing end, and fastening means extending through the apertures for selectively securing either the pair of short length lower straps or the pair of relatively long length lower straps to a pair of opposed anchorage points fixed in a body panel in the vicinity of the vehicle floor.

2. A safety screen assembly according to claim 1 wherein each said strap is pivotally supported by pivot means carried by said movable connector means, whereby the securing strap can be bodily rotated about an axis at right angles to the pivot axis of its associated said pivot means.

3. A safety screen assembly according to claim 1 wherein each said fixed bracket member comprises a first bracket portion secured to the screen frame and a second bracket portion extending rearwardly therefrom, an aperture formed in the second bracket portion, and said movable connector means comprises a U-shaped saddle member carried by the second bracket portion and having its opposed legs projecting rearwardly, beyond the rear transverse edge of the second bracket portion, one on each side of the second bracket portion and its bridge portion passing through the aperture the length of which is much greater than the thickness of the bridge portion, and a pivot member carried between the legs of a respective said saddle member, said strap being pivotally supported by said pivot member.

4. A safety screen assembly according to claim 1 wherein each of the metal securing straps comprises a series of transverse corrugations intermediate the ends thereof, the corrugations being effective to absorb some of the initial impact force when a load impacts against the safety screen.

* * * * *